(12) United States Patent
Diehl et al.

(10) Patent No.: US 10,931,858 B2
(45) Date of Patent: Feb. 23, 2021

(54) MULTI-PLANE IMAGE SENSORS FOR HIGH RESOLUTION DESTINATION DETECTION AND TRACKING

(71) Applicant: THE BOEING COMPANY, Chicago, IL (US)

(72) Inventors: Colin Anthony Minor Diehl, Huntsville, AL (US); David Keith Mefford, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 134 days.

(21) Appl. No.: 16/394,879

(22) Filed: Apr. 25, 2019

(65) Prior Publication Data

US 2020/0344389 A1 Oct. 29, 2020

(51) Int. Cl.
| | |
|---|---|
| *H04N 5/225* | (2006.01) |
| *B64D 47/08* | (2006.01) |
| *G03B 17/56* | (2021.01) |
| *G02B 7/02* | (2021.01) |
| *F16M 11/20* | (2006.01) |
| *G05D 1/00* | (2006.01) |

(52) U.S. Cl.
CPC .......... *H04N 5/2254* (2013.01); *B64D 47/08* (2013.01); *F16M 11/205* (2013.01); *G02B 7/021* (2013.01); *G03B 17/561* (2013.01); *G05D 1/0088* (2013.01)

(58) Field of Classification Search
CPC .... H04N 5/2254; B64D 47/08; F16M 11/205; G02B 7/021; G03B 17/561; G05D 1/0088
See application file for complete search history.

(56) References Cited

U.S. PATENT DOCUMENTS

| | | | | |
|---|---|---|---|---|
| 7,586,678 | B2* | 9/2009 | Bergeron | F41G 7/226 359/420 |
| 7,906,722 | B2* | 3/2011 | Fork | H01L 31/02008 136/246 |
| 10,827,574 | B1* | 11/2020 | Fu | H04N 7/18 |
| 2019/0045144 | A1* | 2/2019 | Reed | G01J 5/0806 |

\* cited by examiner

*Primary Examiner* — Antoinette T Spinks
(74) *Attorney, Agent, or Firm* — Patterson + Sheridan, LLP

(57) ABSTRACT

Certain aspects of the present disclosure provide a method and apparatus for image sensing. Embodiments include a first plurality of light-sensing elements arranged in a first plurality of rows and a first plurality of columns in a first image sensing plane. Embodiments include a first lens element disposed within a position in a central row of the first plurality of rows and in a central column of the first plurality of columns. Embodiments include a second plurality of light-sensing elements arranged in a second plurality of rows in a second image sensing plane, different from the first image sensing plane. In certain embodiments, the first lens element is configured to redirect incident light reflected from a destination onto the second plurality of light-sensing elements in the second image sensing plane for use in guiding a steerable object toward the destination.

20 Claims, 8 Drawing Sheets

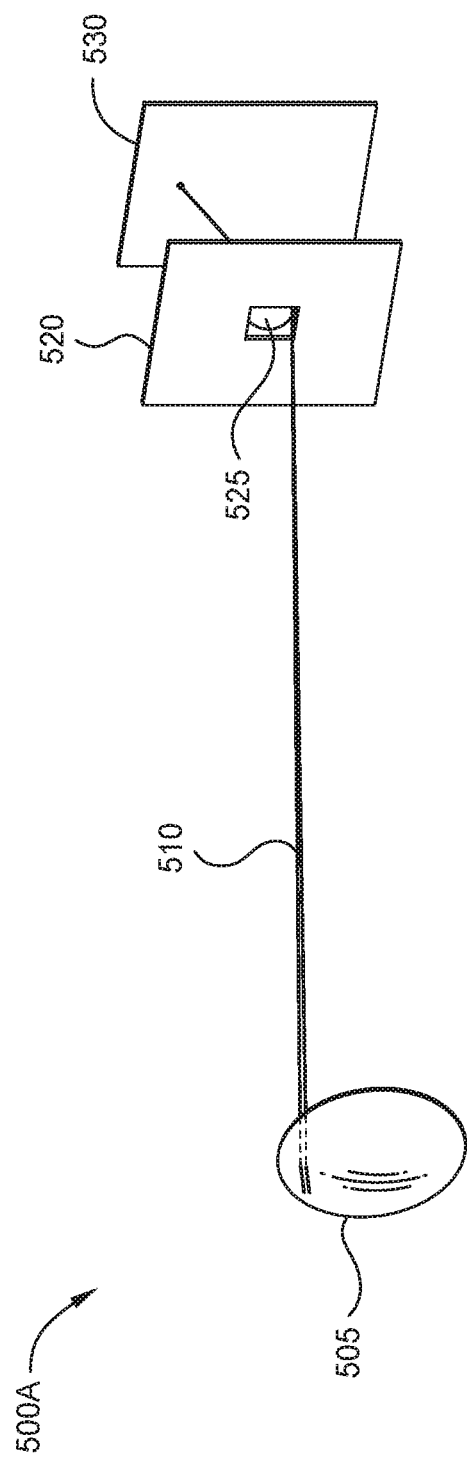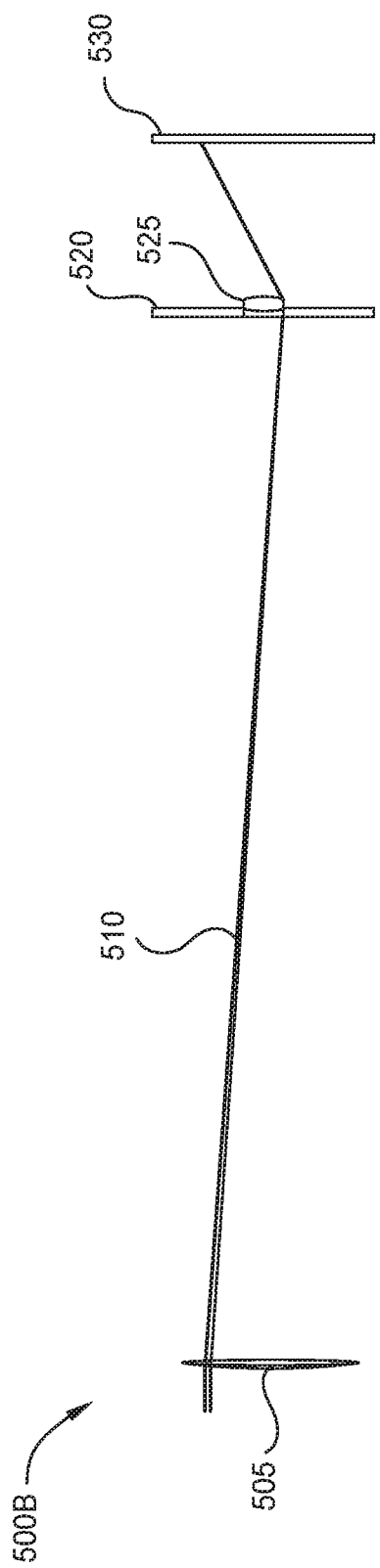
FIG. 5A
FIG. 5B

700

702 — RECEIVE, FROM A TRACKING APPARATUS, A FIRST ARRAY OF IMAGE DATA CAPTURED BY A FIRST PLURALITY OF LIGHT-SENSING ELEMENTS ARRANGED IN A FIRST PLURALITY OF ROWS AND A FIRST PLURALITY OF COLUMNS IN A FIRST IMAGE SENSING PLANE

704 — RECEIVE, FROM THE TRACKING APPARATUS, A SECOND ARRAY OF IMAGE DATA CAPTURED BY A SECOND PLURALITY OF LIGHT-SENSING ELEMENTS ARRANGED IN A SECOND PLURALITY OF ROWS IN A SECOND IMAGE SENSING PLANE, DIFFERENT FROM THE FIRST IMAGE SENSING PLANE, WHEREIN A FIRST LENS ELEMENT DISPOSED WITHIN A POSITION IN A CENTRAL ROW OF THE FIRST PLURALITY OF ROWS AND IN A CENTRAL COLUMN OF THE FIRST PLURALITY OF COLUMNS IS CONFIGURED TO REDIRECT INCIDENT LIGHT ONTO THE SECOND PLURALITY OF LIGHT OF LIGHT-SENSING ELEMENTS IN THE SECOND IMAGE SENSING PLANE

706 — DETERMINE AN IMAGE BASED ON THE FIRST ARRAY OF IMAGE DATA AND THE SECOND ARRAY OF IMAGE DATA, WHEREIN THE IMAGE COMPRISES THE SECOND ARRAY OF IMAGE DATA POSITIONED IN A CENTER OF THE FIRST ARRAY OF THE IMAGE DATA

FIG. 7

MULTI-PLANE IMAGE SENSORS FOR HIGH RESOLUTION DESTINATION DETECTION AND TRACKING

INTRODUCTION

Aspects of the present disclosure relate to using multi-plane light detection element arrays for detection and tracking of light sources, particularly for improved destination detection and tracking.

Destination indication systems may be configured to mark or "paint" a destination using a high-energy directed light source, such as an IR laser. An autonomous vehicle may then detect the destination via a reflected "spot" from the impinging laser and maneuver in such a way as keep the detected laser spot centered in a detection and tracking sensor until the autonomous vehicle reaches the destination.

Existing detection and tracking sensors in autonomous vehicles may need a large and high resolution array of light detection elements in order to accurately track the laser spot as the autonomous vehicle and/or destination moves in order to guide the autonomous vehicle to its destination successfully. Unfortunately, such sensors are expensive and often expendable. Accordingly, cost effective sensor systems for destination detection and tracking are needed.

Accordingly, improved techniques for high-resolution destination detection are needed.

BRIEF SUMMARY

Certain embodiments provide an image sensing apparatus. The image sensing apparatus may comprise: a first plurality of light-sensing elements arranged in a first plurality of rows and a first plurality of columns in a first image sensing plane; a first lens element disposed within a position in a central row of the first plurality of rows and in a central column of the first plurality of columns; and a second plurality of light-sensing elements arranged in a second plurality of rows in a second image sensing plane, different from the first image sensing plane, wherein the first lens element is configured to redirect incident light reflected from a destination onto the second plurality of light-sensing elements in the second image sensing plane for use in guiding a steerable object toward the destination.

In some embodiments, the second image sensing plane is parallel to the first image sensing plane.

In some embodiments, the image sensing apparatus further comprises: a second lens element disposed within a position in a central row of the second plurality of rows and in a central column of the second plurality of columns; and a third plurality of light-sensing elements arranged in a third plurality of rows in a third image sensing plane, different from the first image sensing plane and the second image sensing plane, wherein the second lens element is configured to redirect incident light onto the third plurality of light-sensing elements in the third image sensing plane.

In some embodiments, the image sensing apparatus further comprises an objective lens configure to direct incident light onto the first plurality of light-sensing elements in the first image sensing plane.

In some embodiments, the image sensing apparatus is disposed within a nose of an autonomous vehicle.

In some embodiments, a position of the image sensing apparatus remains fixed within the nose of the autonomous vehicle.

In some embodiments, the nose of the autonomous vehicle does not include a movable gimbal.

In additional embodiments, an image sensing apparatus may comprise: a first plurality of light-sensing elements arranged in a first plurality of rows and a first plurality of columns in a first image sensing plane; a first mirror element disposed within a position in a central row of the first plurality of rows and in a central column of the first plurality of columns; and a second plurality of light-sensing elements arranged in a second plurality of rows in a second image sensing plane, different from the first image sensing plane, wherein the first mirror element is configured to redirect incident light reflected from a destination onto the second plurality of light-sensing elements in the second image sensing plane for use in guiding a steerable object toward the destination.

In some embodiments, the second image sensing plane is parallel to the first image sensing plane.

In some embodiments, the image sensing apparatus further comprises: a second mirror element disposed within a position in a central row of the second plurality of rows and in a central column of the second plurality of columns; and a third plurality of light-sensing elements arranged in a third plurality of rows in a third image sensing plane, different from the first image sensing plane and the second image sensing plane, wherein the second mirror element is configured to redirect incident light onto the third plurality of light-sensing elements in the third image sensing plane.

In some embodiments, the image sensing apparatus further comprises an objective lens configure to direct incident light onto the first plurality of light-sensing elements in the first image sensing plane.

In some embodiments, the tracking apparatus is disposed within a nose of an autonomous vehicle.

In some embodiments, a position of the tracking apparatus remains fixed within the nose of the autonomous vehicle.

In some embodiments, the nose of the autonomous vehicle does not include a movable gimbal.

Additional embodiments provide a method, comprising: receiving, from an image sensing apparatus, a first array of image data captured by a first plurality of light-sensing elements arranged in a first plurality of rows and a first plurality of columns in a first image sensing plan; receiving, from the image sensing apparatus, a second array of image data captured by a second plurality of light-sensing elements arranged in a second plurality of rows in a second image sensing plane, different from the first image sensing plane, wherein a first lens element disposed within a position in a central row of the first plurality of rows and in a central column of the first plurality of columns is configured to redirect incident light reflected from a destination onto the second plurality of light sensing components in the second image sensing plane; and determining an image based on the first array of image data and the second array of image data, wherein the image comprises the second array of image data positioned in a center of the first array of image data.

In some embodiments, the first array of image data comprises a first plurality of pixels, and wherein the second array of image data comprises a second plurality of pixels.

In some embodiments, the method further comprises determining a position of the destination within the image based on the second array of image data.

In some embodiments, the method further comprises determining a path of an autonomous vehicle based on the position of the destination.

In some embodiments, the method further comprises steering the autonomous vehicle based on the position of the destination using one or more of: a propulsion system; or control surfaces.

In some embodiments, the image sensing apparatus is disposed within a nose of the autonomous vehicle.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 5A and 5B depict examples of using a multi-plane image sensor arrangement.

FIG. 7 illustrates example operations for improved detection and tracking as described herein.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide multi-plane image sensor arrangements, which may be used, for example, in detection and tracking systems for autonomous vehicles. Autonomous vehicles may include, for example, unmanned aerial vehicles, unmanned ground vehicles, missiles, guided munitions, missile defense systems, and the like. The multi-plane image sensor arrangements described herein may be implemented in any context where tracking systems are employed.

An image sensor typically consists of an array of light-sensing elements, which may be referred to individually as pixels. Each pixel detects incident light, which may be converted to electronic signals in order to create a digital image.

Figure 1A:
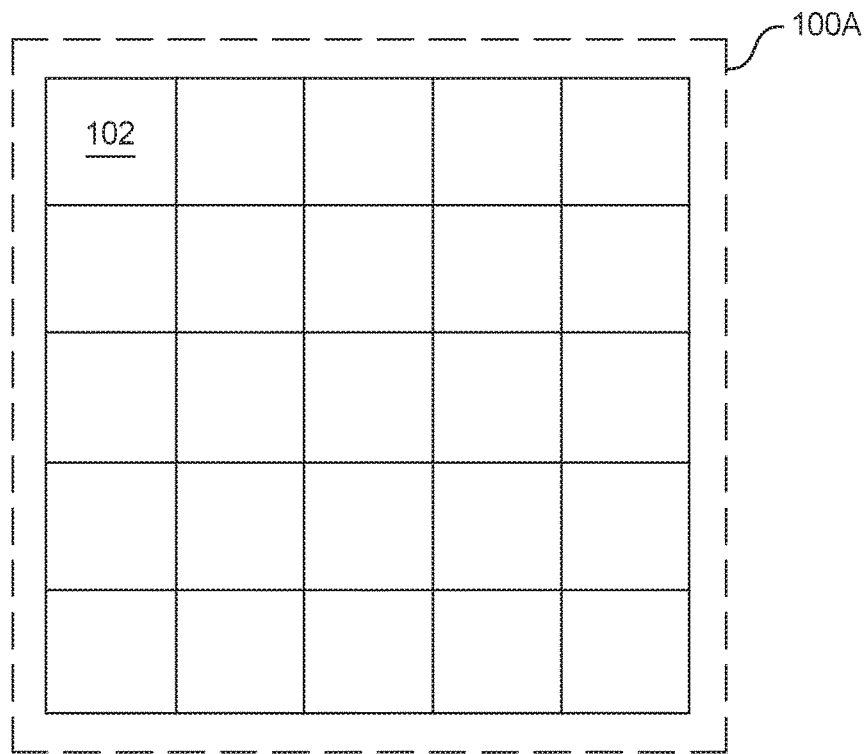
FIGS. 1A and 1B depict examples of image sensing planes.

FIG. 1A depicts an example of an image sensor 100A comprising a plurality of pixels, such as pixel 102. In some implementations, pixels may comprise a semiconductor material, such a p-n junction, which absorbs light and creates a resulting current or voltage that can be measured by an image processor. Image sensors may generally comprise an array of pixels disposed on a substrate for packaging into devices.

Generally, the pixels in an image sensor are all be the same size, and the number of pixels in the image sensor determines the resolution of the produced image. For example, a megapixel sensor may comprise 1,000,000 individual pixels.

The capability of an image sensor, such as image sensor 100A, as a detection and tracking sensor may be related to the resolution of the image sensor. For example a higher resolution of sensor data generally allows for a higher resolution of detection and tracking capability, such as by being able to process a larger image that has more perspective, or being able to process an image with much more detail. Either may contribute to accurate guidance in the context of an autonomous vehicle.

To improve resolution, larger image sensor arrays with more pixels are sometimes used. However, because of packaging constraints, such as within an autonomous vehicle, higher resolution may only be practically achieved by reducing the size of the individual pixels. Unfortunately, smaller pixels are less sensitive to light (owing to their smaller surface area with which to capture the light) and are more expensive to produce. Thus, a smaller image sensor that uses smaller pixels in order to increase resolution may end up with lower light sensitivity and decreased detection and tracking capability.

Figure 1B:
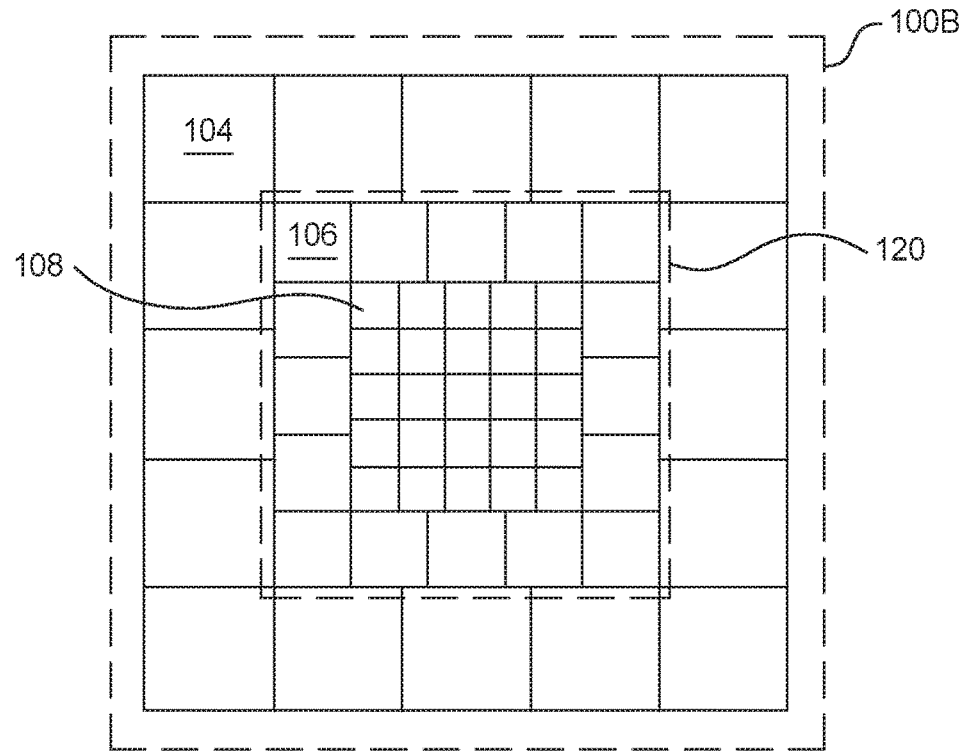

FIG. 1B depicts an example of a specialized image sensor 100B comprising pixels of varying size, such as pixels 104, 106, and 108. In some implementations, the center of an image sensor may correspond to a "boresight" of an autonomous vehicle such that the autonomous vehicle is moving towards whatever is in the center of the image produced by the image sensor. Therefore, an autonomous vehicle may be maneuvered to keep a destination centered in the image to guide the autonomous vehicle into the destination. In order to provide a higher resolution at the center of an image, specialized image sensors may be produced with varying pixel sizes on the same substrate. For example, pixel 106 is smaller than pixel 104, and pixel 108 is smaller than pixel 106.

For example, image sensor 100B comprises smaller pixels in the center portion of the image sensor to concentrate the higher resolution portion of the image sensor in the boresight region 120 of the image sensor. Thus, the lower resolution portions of image sensor 100B may be more sensitive to light (owing to larger pixels) and thus good for initial detection, but may provide more coarse guidance correction capability as compared to the higher resolution portion of image sensor 100B, which may provide very fine guidance but more limited detection capability. However, producing specialized image sensors such as that shown in FIG. 1B may be expensive. Further, varying the pixel size across the sensor causes varying light sensitivity across the image sensor, which may require more powerful (and expensive) image processing capability.

The system described herein provides higher resolution imaging at the center of an image by utilizing multi-plane image sensors comprising optical elements as well as light sensing elements in the boresight region of certain planes. For example, high-resolution imaging in the boresight region can be provided by placing an optical element in the boresight region of a first image sensing plane and refocusing the image onto a second image sensing plane where multiple pixels may take the place of a single pixel in the first image sensing plane. As such, higher resolution can be achieved for certain regions of the image sensor using uniform pixel sizes. Further, relatively larger pixels that are more sensitive to light may be used as higher resolution is provided by the multiple image sensing planes rather than smaller pixels. Generally, multiple image sensing planes may be used to increase the resolution of a boresight region of an image sensor.

Example Multi-Plane Image Sensor Arrangements

Figure 2:
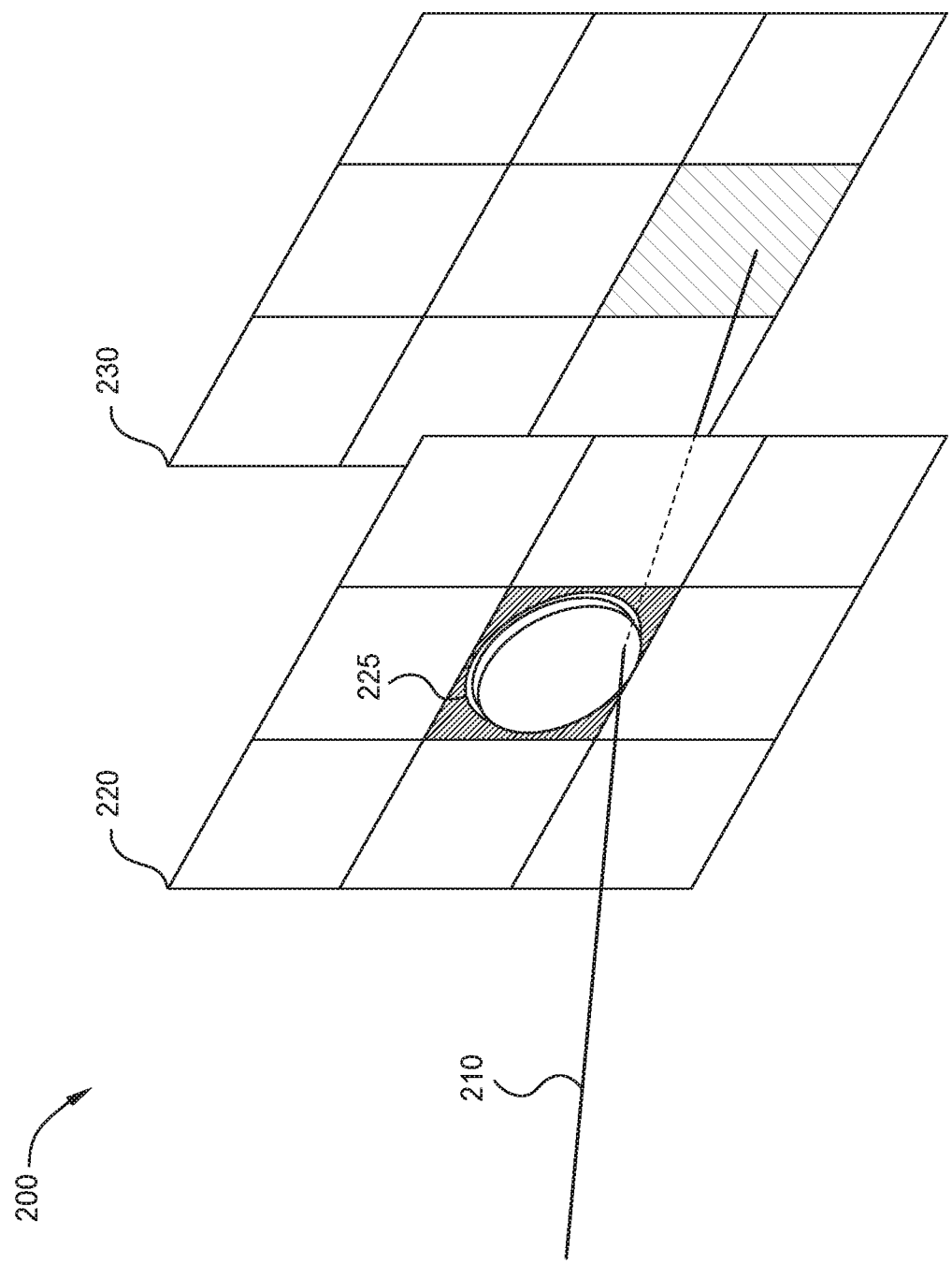
FIG. 2 illustrates an example of a multi-plane image sensor arrangement, which may be useful for detection and tracking systems.

FIG. 2 illustrates an example 200 of a multi-plane image sensor arrangement, which may be useful for detection and tracking systems, such as those found in autonomous vehicles. In example 200, a first image sensing plane 220 includes a plurality of pixels comprising multiple rows and multiple columns. Further, first image sensing plane 220 includes an optical element 225, which in this implementation is a lens, disposed in central or boresight region of first image sensing plane 220. In particular, in this example, optical element 225 is disposed in a central row and in a central column of first image sensing plane 220 instead of a light sensing pixel. Optical element 225 affects incident light 210 and refocuses it onto a second imaging sensing plane 230, which comprises a second array of pixels. Light 210 may represent light reflected from a designated destination. Thus, the original resolution in the boresight region of first image sensing plane 220 was a single pixel, but is now improved to nine pixels in the second image sensing plane 230 via use of optical element 225.

Second image sensing plane 230 also includes a plurality of pixels comprising multiple rows and multiple columns. In this example, second image sensing plane 230 is parallel to first image sensing plane 320.

As shown in example 200, an image with a higher resolution in the center (e.g., 9 pixels instead of 1 pixel) may be produced without developing specialized image sensors with varying pixel sizes or an image sensor with smaller pixels.

Figure 3:
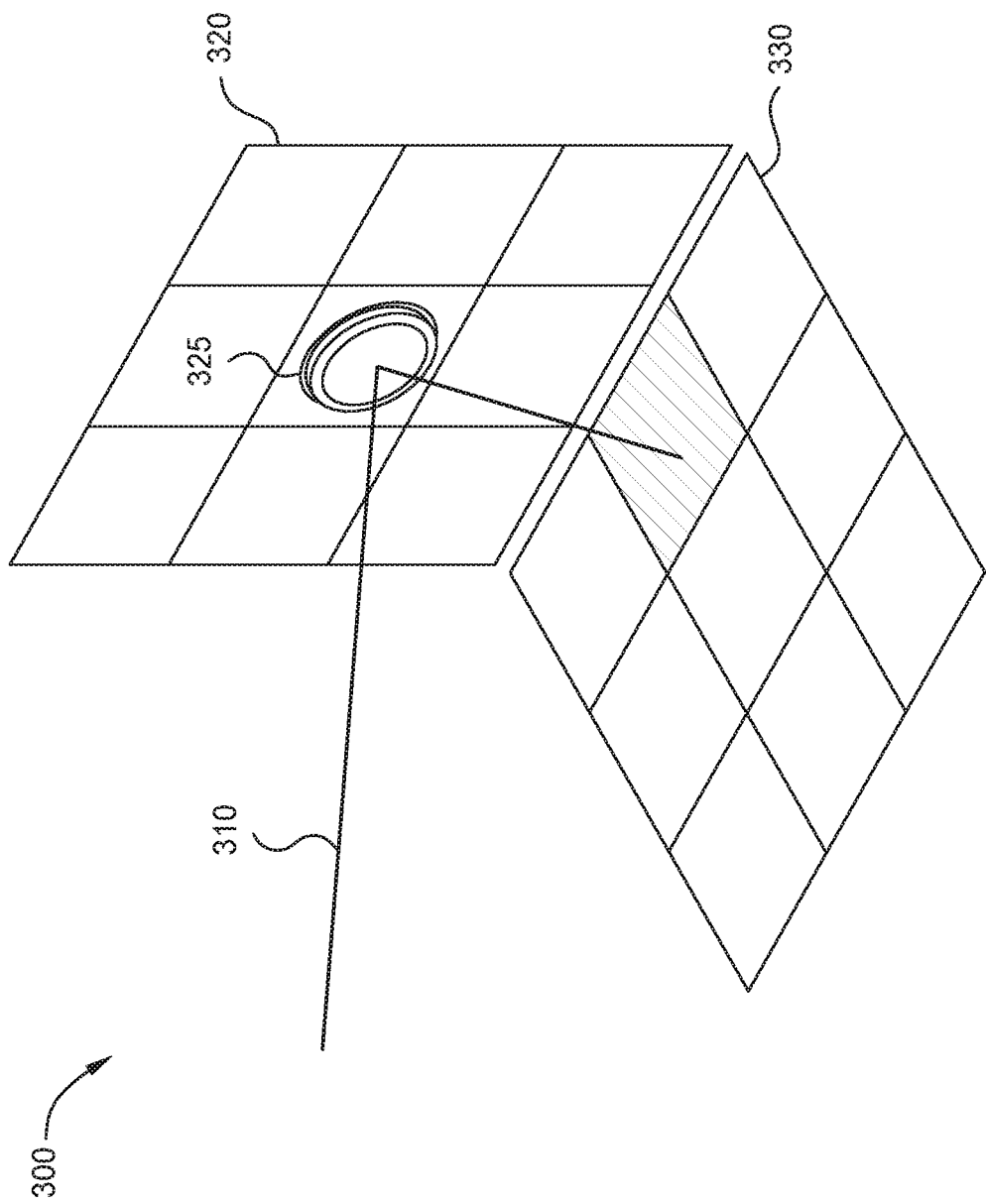
FIG. 3 illustrates another example of a multi-plane image sensor arrangement.

FIG. 3 illustrates another example 300 of an improved tracking system. In example 300, a first image sensing plane 320 includes a plurality of pixels comprising multiple rows and multiple columns and a mirror 325 disposed in a position in a central row and in a central column. Instead of a pixel being located at the center of image sensing plane 320, mirror 325 allows light 310 to be refocused from the center of image sensing plane 320 onto a second image sensing plane 330 for a higher resolution at the center of the image.

Image sensing plane 330 also includes a plurality of pixels comprising multiple rows and multiple columns, and is located in a plane that is perpendicular to image sensing plane 320. Light 310 may represent a light emitted by laser that is used to guide an entity such as an autonomous vehicle. By using mirror 325 to refocus light 310 from the central position of the first image sensing plane 320 onto the second image sensing plane 330, an image is produced with a higher resolution in the center. As such, a position of light 310 may be determined with a higher level of accuracy.

As shown in example 300, an improved tracking system may be produced by replacing a centermost pixel of a standard photodetector with a mirror that redirects incident light onto another photodetector. As such, an image with a higher resolution in the center (e.g., 9 pixels instead of 1 pixel) may be produced without developing specialized photodetectors with varying pixel sizes or a photodetector with smaller pixels.

It is noted that the numbers of pixels shown on image sensing planes 220 and 230 of FIG. 2 and image sensing planes 320 and 330 of FIG. 3 are only included as examples, and fewer or more pixels may be included. Furthermore, while examples 200 and 300 illustrate replacing a single pixel of image sensing plane 220 or 320 with lens 225 or mirror 325, other embodiments may involve replacing more than one pixel with one or more lenses or mirrors that redirect light onto one or more additional image sensing planes. In some embodiments, multiple pixels may be replaced by multiple optical elements that work together as a multi-element optical element. Furthermore, as discussed in more detail below with respect to FIG. 4, certain embodiments may include one or more additional lenses or mirrors replacing one or more pixels of image sensing plane 230 or 330 and redirecting light onto one or more additional image sensing planes.

Figure 4:
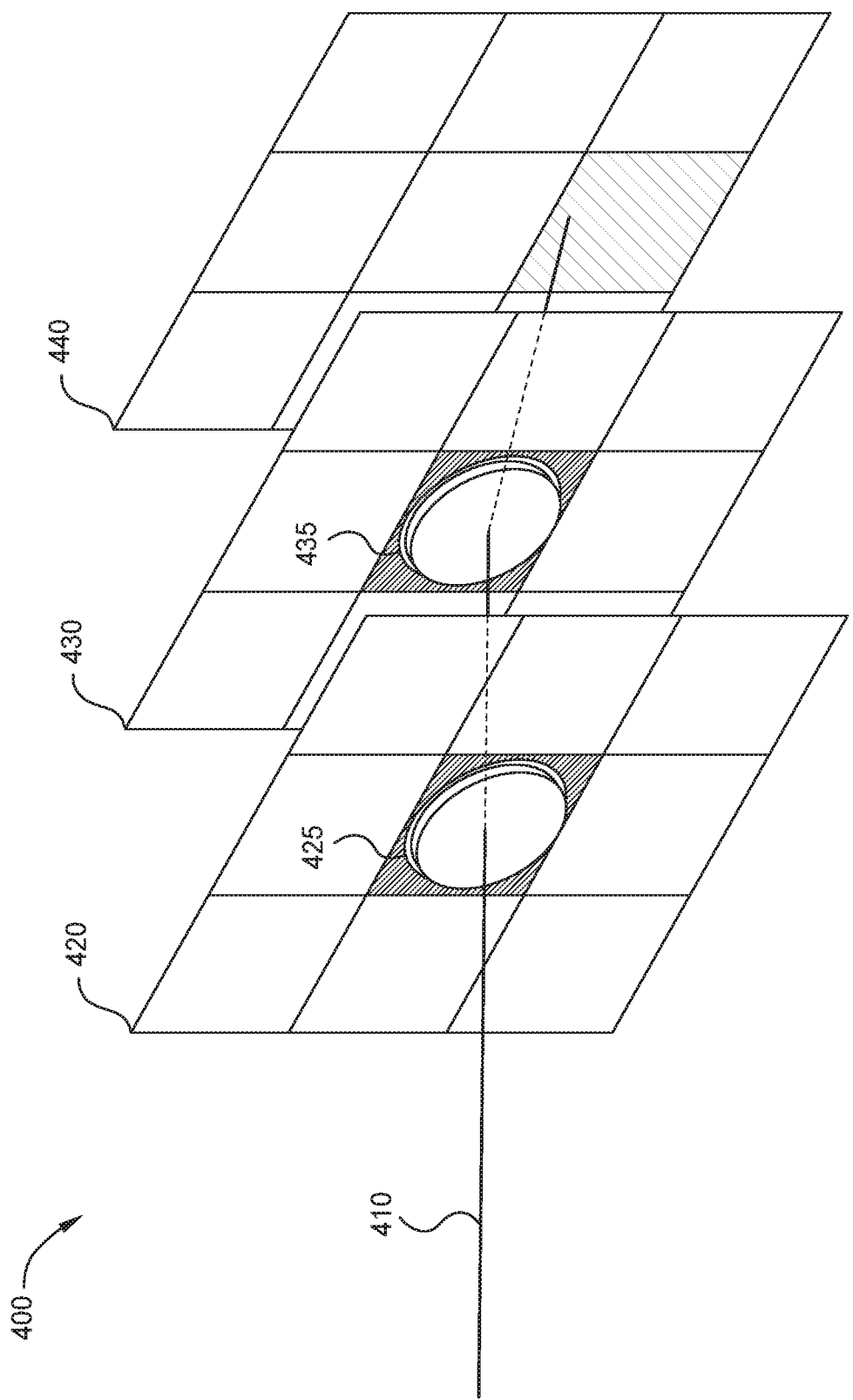
FIG. 4 illustrates another example of a multi-plane image sensor arrangement.

FIG. 4 illustrates another example 400 of an improved tracking system.

In example 400, a first image sensing plane 420 includes a plurality of pixels comprising multiple rows and multiple columns and a lens 425 disposed in a position in a central row and in a central column. Similarly to lens 225 of image sensing plane 220 of FIG. 2, lens 425 allows light 410 to be refocused from the center of image sensing plane 420 onto a second image sensing plane 430 for a higher resolution at the center of the image. However, unlike FIG. 2, the second image sensing plane 430 also includes a lens 435 that allows light to be refocused again onto a third image sensing plane 440 for a still higher resolution at the center of the image. Image sensing planes 420, 430, and 440 are "cascaded", as they are located in different image sensing planes that are parallel to one another.

Similarly to light 210 and 310 in FIGS. 2 and 3, light 410 may represent light reflected from a designated destination. Thus, the original resolution in the boresight region of first image sensing plane 420 was a single pixel, but is now improved to nine pixels in the second image sensing plane 430 and nine more pixels in the third image sensing plane 440 via use of optical elements 425 and 435.

While light 210, 310, and 410 is included in examples 200, 300, and 400 to represent light emitted by a laser and reflected from a designated destination, all of the pixels of the image sensing planes described herein may detect light. For example, while light 410 is depicted as ultimately being detected by the center pixel of the bottom row of pixels of image sensing plane 440, other light surrounding the light 410 emitted by the laser may be detected by all of the pixels of image sensing planes 420, 430, and 440. For example, incident light may be redirected by lens 425 to all of the pixels of image sensing plane 430 and incident light may be redirected by lens 435 to all of the pixels of image sensing plane 440.

FIGS. 5A and 5B depict examples 500A and 500B of using an improved tracking system. FIGS. 5A and 5B depict the same components from different perspectives. In examples 500A and 500B, image sensing planes 520 and 530 may be representative of image sensing planes 220 and 230 of FIG. 2. Similarly, light 510 and lens 525 may be representative of light 210 and lens 225 of FIG. 2.

Examples 500A and 500B include an objective lens 505 which directs light 510 to image sensing planes 520 and 530. For example, objective lens 505 may be positioned at the front of a tracking system disposed in a nose of an autonomous vehicle, and may receive incident light directed toward the front of the autonomous vehicle. An objective lens is generally used for converging light emitted from a light source to a sensing surface, such as image sensing planes 520 and 530. Light 510 may be representative of light emitted from a laser and reflected from a designated destination, and the tracking system may be used to track the position of light 510 so that the autonomous vehicle may be maneuvered accordingly (e.g., to center the tracking system on the position of light 510).

Lens 525 is positioned in the center of image sensing plane 520, and redirects light 520 to image sensing plane 530 in order to capture an image with a higher resolution at its center so that the position of light 510 may be determined with a higher degree of accuracy.

Example Embodiment of Improved Tracking System in an Autonomous Vehicle

Figure 6A:
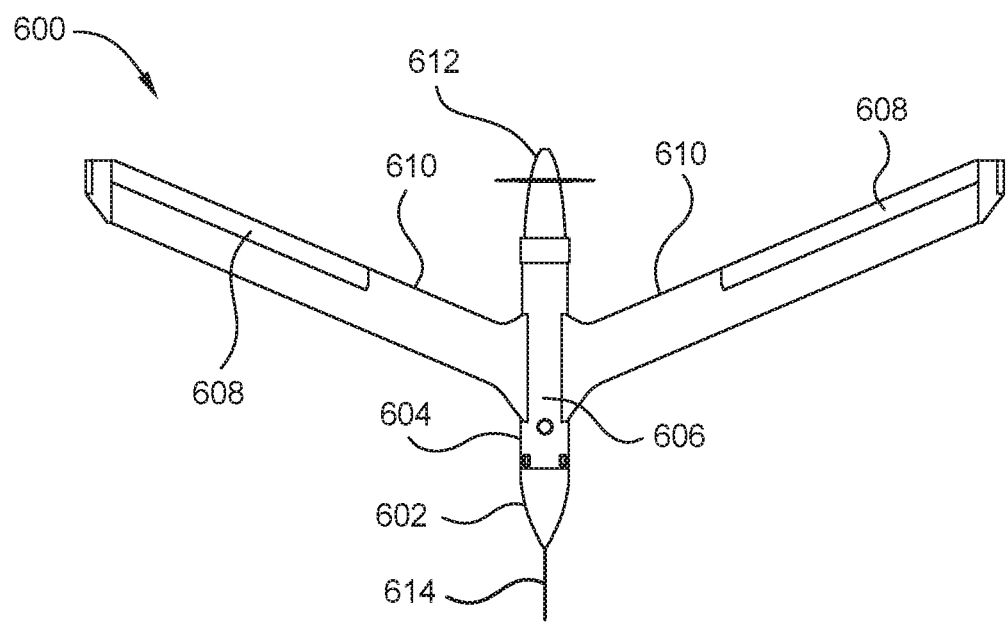
FIGS. 6A and 6B depict example embodiments of multi-plane image sensor arrangements.

FIG. 6A depicts an example embodiment of an improved tracking system. FIG. 6A depicts an autonomous vehicle 600 in which embodiments of the present disclosure may be implemented. For example, autonomous vehicle 600 may represent an unmanned aerial vehicle (UAV).

Autonomous vehicle 600 includes a nose 602, in which embodiments of the present disclosure may be disposed. For example, components of an improved tracking system described above with respect to FIGS. 2-5B and described below with respect FIG. 6B may be included within nose 602.

Autonomous vehicle 600 further comprises guidance system 604, which generally performs operations related to automated control of autonomous vehicle 600. For example, guidance system 604 may control steering of autonomous vehicle 600 based on data detected by components within nose 602 and/or within fuselage 606, which generally includes components related to tracking movement of autonomous vehicle 600. For example, fuselage 606 may represent the body of autonomous vehicle 600, and may include electronic components such as an inertial measurement unit (IMU), a satellite-based positioning system, radars, and/or the like. In some embodiments, one or more of the electronics within fuselage 606 may be omitted.

Autonomous vehicle 600 further comprises control surfaces 608 on wings 610. Control surfaces 608 are a type of flight control surface used in steering autonomous vehicle 600. For example, control surfaces 608 may be moved, such as by instructions from guidance system 604, to adjust an amount of aerodynamic force on autonomous vehicle 600 in order to maneuver autonomous vehicle 600. Autonomous vehicle 600 further includes a propulsion system 612 that is generally used for lift and thrust control. Propulsion system 612 may comprise one or more rotors attached to one or more motors. For example, propulsion system 612 may comprise a rotor attached to a motor that is used to generate thrust and lift by pushing down on air. Autonomous vehicle also comprises a pressure sensor 614, which generally represents one or more pressure-sensitive instruments used in aviation to determine an aircraft's airspeed, Mach number, altitude, and altitude trend.

In some embodiments, guidance system 604 controls propulsion system 612 and/or control surfaces 608 in order to steer autonomous vehicle 600. For example, guidance system 604 may process data captured by a tracking system described herein in order to determine a path for autonomous vehicle 600, and may control propulsion system 612 and/or control surfaces 608 in order to steer autonomous vehicle 600 based on the path. In one example, guidance system 604 maneuvers autonomous vehicle 600, using propulsion system 612 and/or control surfaces 608, so that the tracking system in nose 602 is centered on a destination detected by the tracking system.

In some embodiments, a tracking system described herein is disposed within nose 602, while in other embodiments, a tracking system described herein may be disposed in a housing attached to nose 602.

Figure 6B:
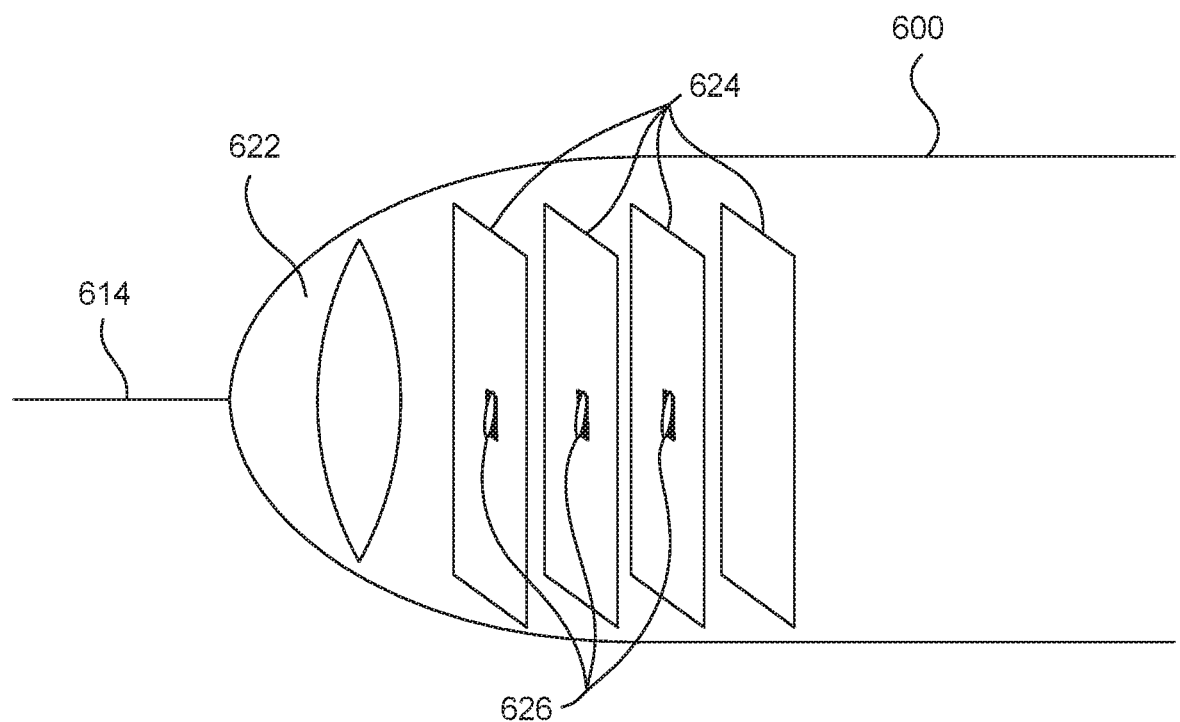

FIG. 6B depicts an example embodiment of an improved tracking system, such as may be used in an autonomous vehicle, such as described in FIG. 6A.

Objective lens 622 may operate as described with respect to objective lens 505 of FIGS. 5A and 5B. Each of imaging sensing planes 624 is generally representative of an array of light sensing elements, some of which also include optical elements, such as described above with respect to FIGS. 2-5B. In this example, lenses 626 are disposed in the center of three of image sensing planes 624, and each lens 626 redirecting light towards the next image sensing plane in the stack.

For example, a laser may be directed onto a destination, and the tracking system depicted in FIG. 6B may be used to track the position of light emitted by the laser and reflected off of the destination. In one example, objective lens 622 directs the light onto the first image sensing plane 624, and each of lenses 626 redirects the light onto the next image sensing plane 624. As such, the position of the destination may be tracked with precision based on the position of the light in images with increasingly higher resolution towards the center.

It is noted that, in some cases, light reflected from a destination may land on a pixel of the first, second, or third image sensing plane 624 rather than passing through the lenses 626 to each subsequent image sensing plane 624. As such, the light may not always reach the fourth image sensing plane 624. In such cases, it may be determined that autonomous vehicle 600 is off course, and must be steered in such a way as to center the light on image sensing planes 624 so that the light passes through each of lenses 626 and reaches the fourth image sensing plane 624.

Autonomous vehicle 600 may be steered based on the data determined by the tracking system. For example, guidance system 604 of FIG. 6A may steer autonomous vehicle 600 based on the images captured by the tracking system, such as by controlling propulsion system 612 and/or control surfaces 608 of FIG. 6A. As such, autonomous vehicle 600 may be automatically guided along a path towards the destination.

Tracking systems described herein may augment and/or replace one or more components of conventional autonomous vehicles, such as within a nose or seeker head of the autonomous vehicle. For example, a movable gimbal with drive motors and/or position revolvers, as well as a power control module for the gimbal and an inertial measurement unit (IMU) to stabilize the gimbal, may be omitted from a nose of an autonomous vehicle that implements techniques described herein. Certain scan motor electronics may also be omitted from an autonomous vehicle that implements techniques described herein. This is because the higher resolution boresight imaging provided by techniques described herein allows the image sensing planes to remain fixed, without requiring a movable gimbal and associated electronics, as the autonomous vehicle can be effectively steered based on the high resolution images so that the fixed image sensing plane is centered on the detected destination.

It is noted that, while embodiments involving autonomous vehicles are included in the present disclosure, techniques described herein may be used in other contexts, such as for guiding other steerable objects.

FIG. 7 depicts example operations 700 for improved tracking as described herein. For example, operations 700 may be performed by guidance system 604 of FIG. 6A or by a processing component associated with autonomous vehicle 600 of FIGS. 6A and 6B.

At step 702, a first array of image data captured by a first plurality of light-sensing elements arranged in a first plurality of rows and a first plurality of columns in a first image sensing plane is received. For example, the first plurality of light-sensing elements arranged in the first plurality of rows and the first plurality of columns in the first image sensing plane may correspond to the pixels of image sensing plane 220 of FIG. 2. A processing component may receive the image data corresponding to the pixels of image sensing plane 220 of FIG. 2 as the first array of image data.

At step 704, a second array of image data captured by a second plurality of light-sensing elements arranged in a second plurality of rows in a second image sensing plane, different from the first image sensing plane is received from the tracking apparatus, wherein a first lens element disposed within a position in a central row of the first plurality of rows and in a central column of the first plurality of columns is configured to redirect incident light onto the second plurality of light sensing components in the second image sensing plane. For example, the second plurality of light-sensing elements arranged in the second plurality of rows and the second plurality of columns in the second image sensing plane may correspond to the pixels of image sensing plane 230 of FIG. 2 and the first lens element may correspond to lens 225 of FIG. 2. As shown in FIG. 2, image sensing plane 230 is in a second plane that is parallel to a first plane of image sensing plane 220. In alternative embodiments, as depicted in FIG. 3, a mirror rather than a lens may be disposed within the position in the central row of the first plurality of rows and in the central column of the first plurality of columns, and the second image sensing plane may be perpendicular to the first image sensing plane. In alternative embodiments, the lens or mirror may be disposed in a different position in the first image sensing plane rather than being disposed in the central row of the first plurality of rows and in the central column of the first plurality of columns. The processing component may receive the image data corresponding to the pixels of image sensing plane 230 of FIG. 2 as the second array of image data.

At step 706, an image is determined based on the first array of image data and the second array of image data, wherein the image comprises the second array of image data positioned in a center of the first array of image data. For example, the processing component may determine an image with a higher resolution at its center by inserting the second array of image data into a central location in the first array of image data. The image may then be used to determine a position of a destination, such as based on a position of light emitted by a laser within the image. The position of the destination may then be used to determine a path of an autonomous vehicle, such as autonomous vehicle 600 of FIGS. 6A and 6B. For example, guidance system 604 of FIG. 6A may steer the autonomous vehicle based on the position of the destination, such as by controlling propulsion system 612 and/or control surfaces 608 of FIG. 6A to direct the autonomous vehicle toward the destination.

Determining a position of a destination based on a position of light within an image may involve, for example, identifying which pixel of the image the light is located in. For example, the light may be emitted by a laser and reflected from the destination, and may be detected by a particular pixel in one of the image sensing planes as a single point of light. Guidance system 604 of FIG. 6A may steer the autonomous vehicle. in which the image sensing planes are fixed, so that the single point of light falls within the centermost pixel of the images captured from the image sensing planes.

Figure 8:
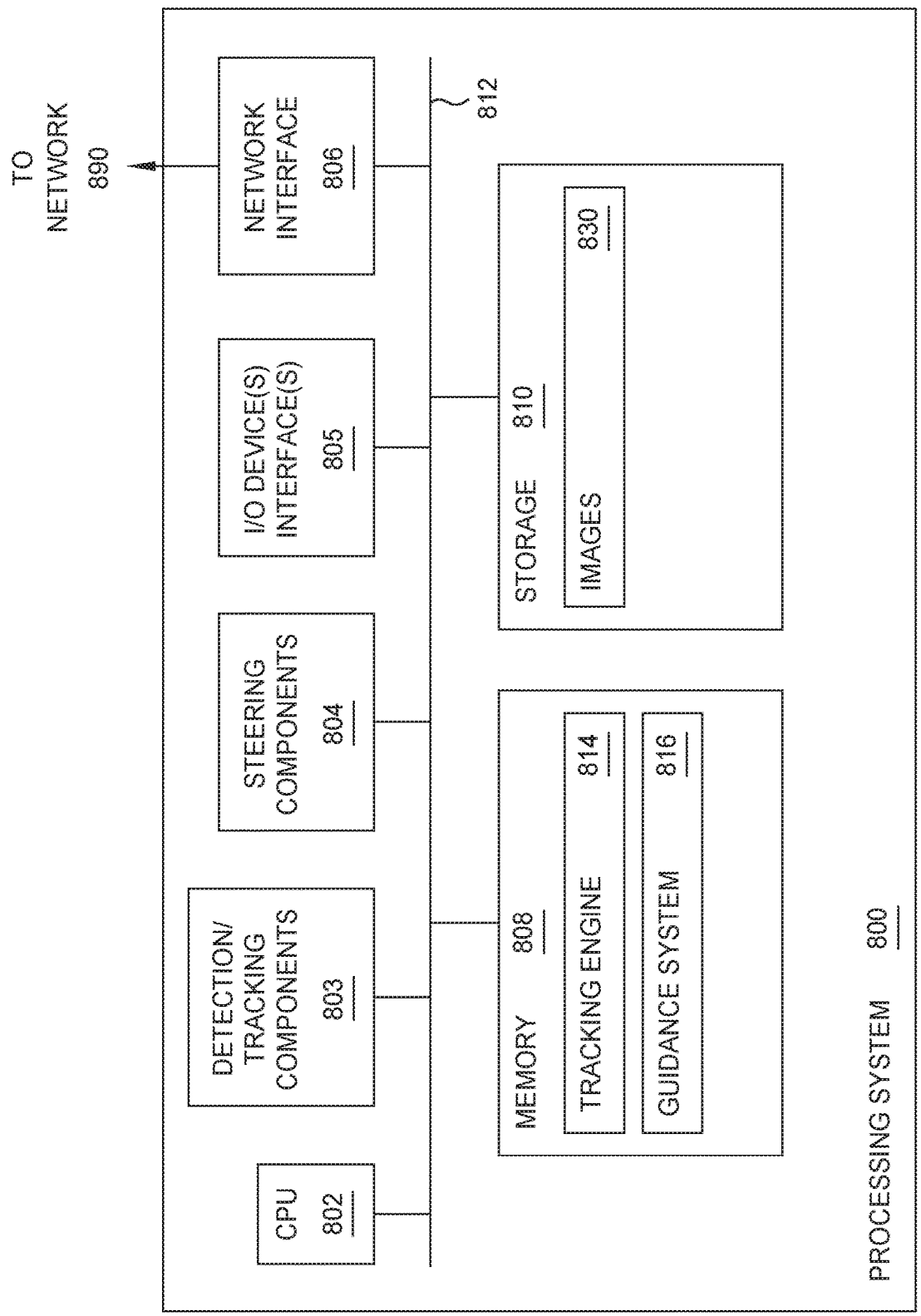
FIG. 8 illustrates an example processing system with which embodiments of the present disclosure may be implemented.

FIG. 8 depicts a processing system 800 that may be used to perform methods described herein, such as the operations for improved detection and tracking described above with respect to FIG. 7.

Processing system 800 includes a CPU 802, detection/tracking components 803, and steering components 804, all connected to a data bus 812. CPU 802 is configured to process computer-executable instructions, e.g., stored in memory 808 or storage 810, and to cause processing system 800 to perform methods as described herein, for example with respect to FIG. 7. Though depicted as only including only one CPU 802, processing system 800 may have more than one processor. Detection/tracking components 803 generally represent components described herein for improved detection and tracking, such as those depicted in the multi-plane image sensor arrangements of FIGS. 2-6B. For example, detection/tracking components 803 may comprise objective lens 622 image sensing planes 624, and lenses 626 of FIG. 6B.

Steering components 804 may generally represent components used to steer an autonomous vehicle or other steerable object, such as propulsion system 612 and/or control surfaces 608 of autonomous vehicle 600 of FIG. 6A.

Processing system 800 further includes input/output device(s) and interface(s) 805, which allows processing system 800 to interface with input/output devices, such as, for example, keyboards, displays, mouse devices, pen input, and other devices that allow for interaction with processing system 800. Note that while not depicted with independent external I/O devices, processing system 800 may connect with external I/O devices through physical and wireless connections (e.g., an external display device).

Processing system 800 further includes network interface 806, which provides processing system 800 with access to external networks, such as network 890, and thereby external computing devices.

Processing system 800 further includes memory 808, which in this example includes tracking engine 814 and guidance system 816, which may, together and/or separately, perform operations described above with respect FIG. 7. In one example, tracking engine 814 receives images 830 from detection/tracking components 803 and determines the position of a destination based on images 830. Tracking engine 814 may then communicate with guidance system 816, which may perform steering operations via steering components 804 to guide a steerable object toward the destination, such as by using steering components 804 to maneuver the steerable object so that detection/tracking components 803 (e.g., which may be disposed in a nose of the steerable object) are centered on the destination. For example, guidance system 816 may generally represent guidance system 604 of FIG. 6A.

Note that while shown as a single memory 808 in FIG. 8 for simplicity, the various aspects stored in memory 808 may be stored in different physical memories, but all accessible to CPU 802 via data connections, such as bus 812.

Processing system 800 further includes storage 810, which in this example includes images 830, which may represent images captured using detection/tracking components 803.

While not depicted in FIG. 8, other aspects may be included in storage 810.

As with memory 808, a single storage 810 is depicted in FIG. 8 for simplicity, but the various aspects stored in storage 810 may be stored in different physical storages, but all accessible to CPU 802 via internal data connections, such as bus 812, I/O interfaces 805, or external connection, such as network interface 806.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An image sensing apparatus, comprising:
    a first plurality of light-sensing elements arranged in a first plurality of rows and a first plurality of columns in a first image sensing plane;
    a first lens element disposed within a position in a central row of the first plurality of rows and in a central column of the first plurality of columns; and
    a second plurality of light-sensing elements arranged in a second plurality of rows in a second image sensing plane, different from the first image sensing plane,
    wherein the first lens element is configured to redirect incident light reflected from a destination onto the second plurality of light-sensing elements in the second image sensing plane for use in guiding a steerable object toward the destination.

2. The image sensing apparatus of claim 1, wherein the second image sensing plane is parallel to the first image sensing plane.

3. The image sensing apparatus of claim 1, further comprising:
    a second lens element disposed within a position in a central row of the second plurality of rows and in a central column of the second plurality of columns; and
    a third plurality of light-sensing elements arranged in a third plurality of rows in a third image sensing plane, different from the first image sensing plane and the second image sensing plane,
    wherein the second lens element is configured to redirect incident light onto the third plurality of light-sensing elements in the third image sensing plane.

4. The image sensing apparatus of claim 1, further comprising an objective lens configure to direct incident light onto the first plurality of light-sensing elements in the first image sensing plane.

5. The image sensing apparatus of claim 1, wherein the image sensing apparatus is disposed within a nose of an autonomous vehicle.

6. The image sensing apparatus of claim 5, wherein a position of the image sensing apparatus remains fixed within the nose of the autonomous vehicle.

7. The image sensing apparatus of claim 5, wherein the nose of the autonomous vehicle does not include a movable gimbal.

8. An image sensing apparatus, comprising:
    a first plurality of light-sensing elements arranged in a first plurality of rows and a first plurality of columns in a first image sensing plane;
    a first mirror element disposed within a position in a central row of the first plurality of rows and in a central column of the first plurality of columns; and
    a second plurality of light-sensing elements arranged in a second plurality of rows in a second image sensing plane, different from the first image sensing plane,
    wherein the first mirror element is configured to redirect incident light reflected from a destination onto the second plurality of light-sensing elements in the second image sensing plane for use in guiding a steerable object toward the destination.

9. The image sensing apparatus of claim 8, wherein the second image sensing plane is perpendicular to the first image sensing plane.

10. The image sensing apparatus of claim 8, further comprising:
    a second mirror element disposed within a position in a central row of the second plurality of rows and in a central column of the second plurality of columns; and
    a third plurality of light-sensing elements arranged in a third plurality of rows in a third image sensing plane, different from the first image sensing plane and the second image sensing plane,
    wherein the second mirror element is configured to redirect incident light onto the third plurality of light-sensing elements in the third image sensing plane.

11. The image sensing apparatus of claim 8, further comprising an objective lens configure to direct incident light onto the first plurality of light-sensing elements in the first image sensing plane.

12. The image sensing apparatus of claim 8, wherein the image sensing apparatus is disposed within a nose of an autonomous vehicle.

13. The image sensing apparatus of claim 12, wherein a position of the image sensing apparatus remains fixed within the nose of the autonomous vehicle.

14. The image sensing apparatus of claim 12 wherein the nose of the autonomous vehicle does not include a movable gimbal.

15. A method, comprising:
    receiving, from an image sensing apparatus, a first array of image data captured by a first plurality of light-sensing elements arranged in a first plurality of rows and a first plurality of columns in a first image sensing plan;

receiving, from the image sensing apparatus, a second array of image data captured by a second plurality of light-sensing elements arranged in a second plurality of rows in a second image sensing plane, different from the first image sensing plane, wherein a first lens element disposed within a position in a central row of the first plurality of rows and in a central column of the first plurality of columns is configured to redirect incident light reflected from a destination onto the second plurality of light sensing components in the second image sensing plane; and determining an image based on the first array of image data and the second array of image data, wherein the image comprises the second array of image data positioned in a center of the first array of image data.

16. The method of claim 15, wherein the first array of image data comprises a first plurality of pixels, and wherein the second array of image data comprises a second plurality of pixels.

17. The method of claim 15, further comprising determining a position of the destination within the image based on the second array of image data.

18. The method of claim 17, further comprising determining a path of an autonomous vehicle based on the position of the destination.

19. The method of claim 17, further comprising steering the autonomous vehicle based on the position of the destination using one or more of: a propulsion system; or control surfaces.

20. The method of claim 15, wherein the image sensing apparatus is disposed within a nose of an autonomous vehicle.

* * * * *